United States Patent [19]
Ewald, Jr.

[11] Patent Number: 5,189,981
[45] Date of Patent: Mar. 2, 1993

[54] FISH FARM

[76] Inventor: Herbert J. Ewald, Jr., 615 Avenue A, Karnes City, Tex. 78118

[21] Appl. No.: 746,786

[22] Filed: Aug. 16, 1991

[51] Int. Cl.⁵ .............................................. A01K 63/00
[52] U.S. Cl. ............................................................ 119/3
[58] Field of Search ........................................ 119/3, 5

[56] References Cited

U.S. PATENT DOCUMENTS

| | | | |
|---|---|---|---|
| 3,122,126 | 2/1964 | Yamada | 119/3 |
| 3,756,197 | 9/1973 | Buss et al. | 119/3 |
| 4,836,142 | 6/1989 | Duback | 119/5 |
| 4,961,400 | 10/1990 | Lapray | 119/3 |
| 5,005,521 | 4/1991 | Strong | 119/5 |

FOREIGN PATENT DOCUMENTS

| | | | |
|---|---|---|---|
| 59987 | 7/1913 | Austria | 119/3 |
| 6361 | of 1901 | United Kingdom | 119/5 |

Primary Examiner—Cary E. O'Connor
Assistant Examiner—Todd E. Manahan
Attorney, Agent, or Firm—Vaden, Eickenroht, Thompson, Boulware & Feather

[57] ABSTRACT

There is disclosed a fish farm having a plurality of laterally extending, open tanks arranged in side by side relation, together with a header for supplying water to the upstream tank, and outlet openings in the downstream side of the first tank and each of the successive tanks for permitting water to flow over a spillway leading into the open top of the succeeding tank, and, in the case of the downstream tank, leading to a filter for removing waste particles prior to recirculation of the water back into the header for the upstream tank.

1 Claim, 2 Drawing Sheets

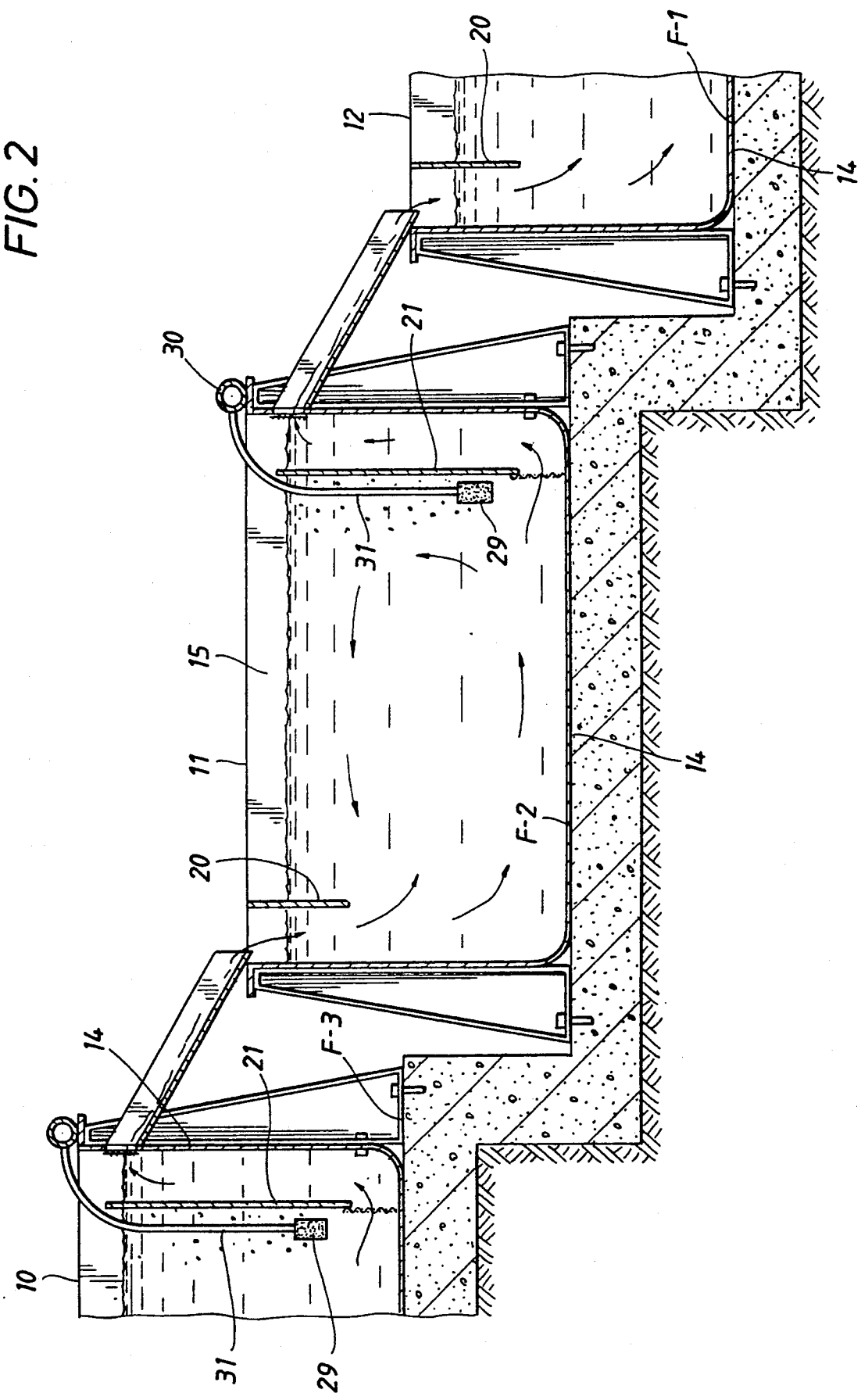

FISH FARM

BACKGROUND OF THE INVENTION

1. Field of the Invention

This invention relates generally to fish farms, and, more particularly, to improvements in fish farms of the type in which the fish are raised in an open tank or raceway through which water is circulated to permit fecal matter and other waste to be removed therefrom and thus reduce bacteria in the water.

2. Description of the Prior Art

U.S. Pat. No. 4,244,486 shows an open tank which is especially well adapted for use as "raceway" of this type. In order to reduce its bacterial content, air may be injected into the water through air stones or jets suspended in the tank. Preferably, the jets are so arranged around the perimeter of the tank as to induce circulation in a generally horizontal path which is intended to direct the waste to a place of disposal. However, due to the length of tank, and hence the long path of circulation, the waste tends to settle out and must be removed through standpipes.

It is often necessary in fish cultures of this type to separate certain types of fish from one another or to separate the smaller fish from the larger fish of the same type. It is also known that some types of fish are heartier than others and thus able to grow in water having higher waste particles level than others.

Water is of course a scarce as well as expensive commodity. Hence, as the water leaves the tank, it is preferably passed through a filter that it may be returned to the tank for reuse. U.S. Pat. No. 4,806,237 shows a filter particularly useful for this purpose. However, even when this is done, each tank still requires its own source of water.

An object of this invention is to provide a fish farm in which two or more types an/or sizes of fish may be raised, but which requires no more water than would be required to raise a single type and/or size in a conventional tank or raceway, and, more particularly, to provide such a farm in which the fish may be grown separately in each of two or more tanks or raceways which are so constructed and arranged that the same source of water is circulated from one to the other without the need for pumps or other expensive and accident prone equipment.

SUMMARY OF THE INVENTION

This and other objects are accomplished, in accordance with the illustrated embodiment of the invention, by a fish farm of the type described including first and second laterally extending, open tanks arranged in side by side relation, with each tank having a first vertical wall extending laterally thereacross near its upstream side and with the lower edge of the wall a substantial distance above the bottom of the tank, and a second vertical wall extending laterally thereacross near its downstream side and with the lower edge of the wall close to the bottom of the tank. Water is supplied to the first tank on the upstream side of the first wall therein, and transferred from the first tank to the second tank by means which includes outlet openings in the downstream side of the first tank and a spillway extending from the first to the second tank to permit the water to flow by gravity from the outlet openings into the second tank on the upstream side of the first wall of the second tank, and then transferred from the second tank by means which includes outlet openings in the downstream side thereof. More particularly, the lower edges of the outlet opening in each tank are intermediate the upper and lower edges of the first and second walls thereof, whereby, water must pass beneath the lower edges of the first wall of each tank in order to induce flow along the bottom as it enters the tank, as well as beneath the lower edge of the second wall of each tank so as to deter fish from leaving the tank with the water which is sucked up through the space between the second wall and downstream side of the tank and into the outlet openings therein.

Feed in each tank is thus caused to accumulate on the downstream side of the first wall, where it may be eaten by the fish. Excess food and other waste which drops to the bottom of the tank is swept by water flow toward the downstream side of the tank where it accumulates behind the second wall and is induced to flow upwardly with the water between the second wall and downstream side of the tank and into the outlet openings from the tank.

There may, of course be three or more tanks to receive fish of a different type and/or size, with the least hardy being raised in the first tank which contains the cleanest water and the hardiest being contained in the last tank. The water from the last tank is preferably transferred to and circulated through a filter for removing the waste therefrom, and the filtered water returned to the first tank for recirculation.

Preferably, a means is provided for injecting air into the water of each tank near the upstream side of the second wall thereof. This not only increases the oxygen contain of the water and thus reduces its waste particles count, but also agitates it to induce a flow pattern from the second wall back toward the upstream side of the tank from which it is recirculated along the bottom of the tank.

BRIEF DESCRIPTION OF THE DRAWINGS

In the illustrated and preferred embodiment, the tanks are of the same size with the first tank supported at a higher level than the second tank, and the sides of the tanks are spaced from and supported independently up one another, whereby each may be assembled independently.

In the drawings, wherein like reference characters are used throughout:

FIG. 2 is a vertical section of a portion of the farm, on an enlarged scale.

DESCRIPTION OF THE PREFERRED EMBODIMENTS

Figure 1:
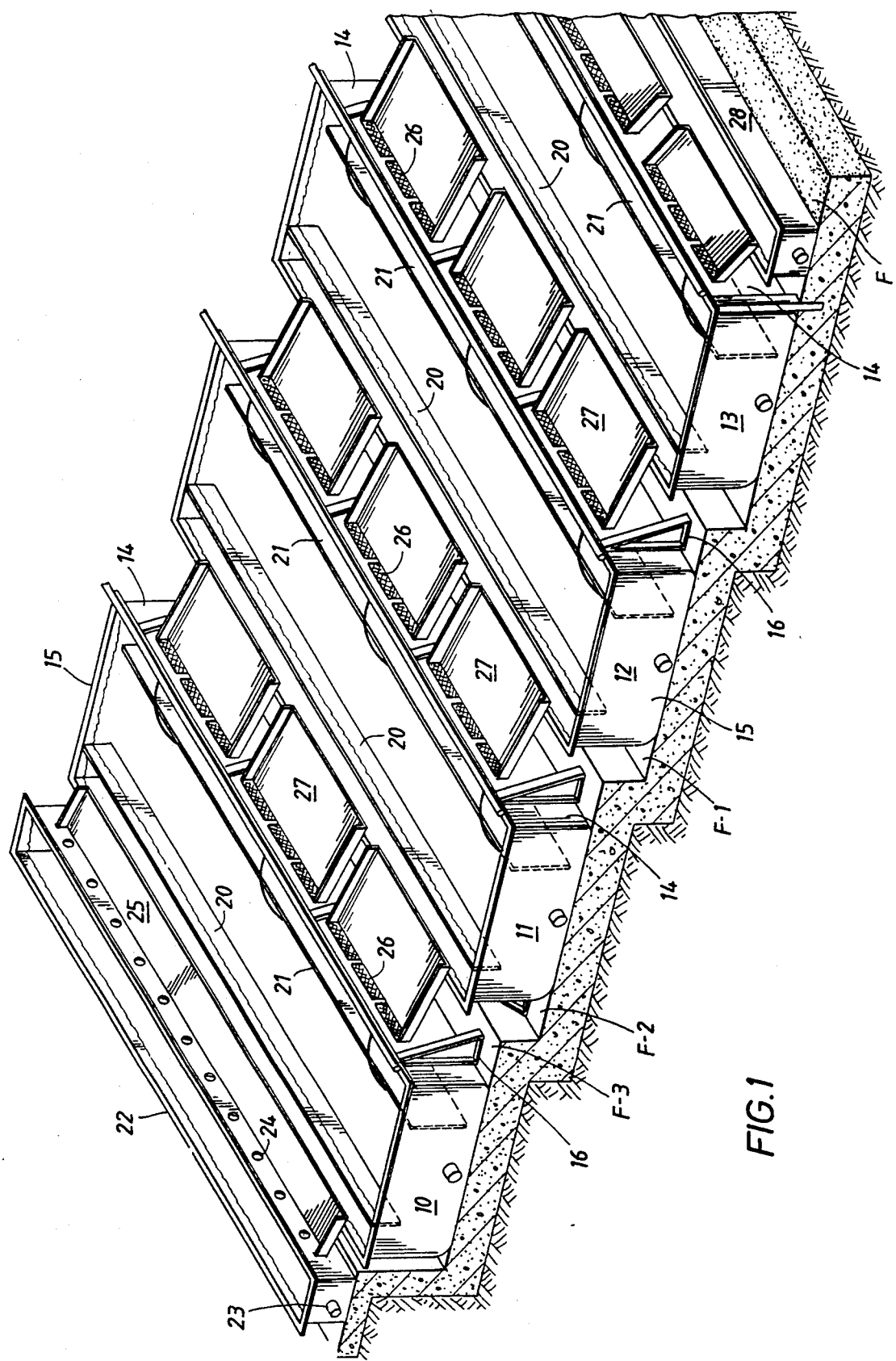
FIG. 1 is a perspective view of the preferred embodiment of the fish farm of the present invention, as seen from above and to one side thereof.

With reference now to the details of the above described drawings, the farm is shown in FIG. 1 to include four tanks, 10, 11, 12, and 13 each of the same construction and arranged to extend laterally in side by side, spaced relation. More particularly, each such tank is of basically the same construction shown and described in the aforementioned U.S. Pat. No. 4,244,486, wherein the bottom and sides thereof are formed of a single sheet 14 of flexible plastic material bent into a "U" shape, and end walls 15 connected to the edges of the open ends of the bent sheet, thus providing the tank with an open top.

Each tank is independently supported along its upstream and downstream sides, including uprights on their interior sides mounted on suitable foundations. More particularly, the tanks are supported at successively lower levels from the left hand upstream end of the farm to the downstream right hand downstream end of the farm. Consequently, the downstream tank 13 may be supported on the floor level F, and the intermediate and upstream tanks supported on a built up foundations F-1, F-2 and F-3.

As previously described, each tank has a first wall 20 extending laterally thereacross near its upstream side and having a lower edge a substantial distance above the bottom of the tank, as well as a second wall 21 extending laterally thereacross near the downstream side of the tank with its lower edge near the bottom of the tank. Water is supplied to the upstream tank on the upstream side of its first wall by means of a header 22 which extends laterally the entire length of the tank. Water is supplied to the header by means of an inlet pipe 23 leading from a suitable source, and outlet openings 24 are formed on the downstream side of the header for discharge onto a spillway 25 leading into the first tank 10 on the upstream side of its first wall 20.

Water is supplied from the upstream tank 10 to the first intermediate tank 11 by means of outlet openings 26 formed in the downstream side of the first tank near its upper edge and leading to a spillway 27 which extends downwardly to convey water into the next succeeding tank 11 on the upstream side of its first wall. Water is then transferred from the tank 11 into the tank 12 and from the tank 12 into the tank 13 in the same manner, and then from tank 13 into a trough 28, or, if preferred, circulated through a filter in order to remove waste therefrom, and then recirculated back to the header for the upstream tank. As shown, the spillway 27 is made up of separate sections arranged laterally above the space between the interconnected tanks.

As also previously described, the lower edges of the outlet openings 26 from the upstream tank 10 are intermediate the upper and lower edges of each of the first and second walls of the upstream tank. Similarly, the lower edges of the outlet openings 26 in the downstream wall of each successive tank are intermediate the upper and lower edges of its first and second walls thereof. Consequently, the water level is maintained in each tank above the lower edge of the first wall as well as above the lower edge of the second wall, so that food for the fish is caused to accumulate on the downstream side of the first wall, rather than being sucked into a position beneath the outlet end of the spillway into the tank, and as also previously described, the discharge of water into the tank on the upstream side of the first wall causes it to flow downwardly toward the bottom of that tank, and then in a rearward direction along the bottom of the tank, whereby waste particles are swept along the bottom toward the downstream side of the tank beneath the lower edge of the second wall into space between the second wall and downstream side of the tank. Consequently, water is caused to flow upwardly into the space and out the outlet openings in the downstream wall of the tank, carrying with it the waste particles.

As shown, a screen is preferably mounted across the lateral opening between the lower edge of the second wall and bottom of each tank, thus providing a further deterrent toward fish being pulled into the space behind the second wall. Similar screens are also shown across the outlet openings from the tank.

As also indicated in the drawings, air stones 29 are suspended within each tank in spaced apart relation along the upstream side of the second wall of each tank. Air is supplied to each of the air stones through an air header 30 leading from a suitable source of compressed air connecting with the stones through tubes 31. As previously noted, this aeration of the water not only reduces its bacteria content, but also induces flow upwardly along the upstream side of the second wall, and thus in a forward path along the upper surface of the water, where it enters the downward flow on the upstream side of the tank.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A fish farm comprising:

first and second laterally extending, open tanks arranged in side by side relation;

a first vertical wall extending laterally across each tank near its upstream side and with the lower edge of the wall a substantial distance above the bottom of the tank;

a second vertical wall extending laterally across each tank near its downstream side and with the lower edge of the wall close to the bottom of the tank;

means for supplying water to the first tank on the upstream side of the first wall therein;

means for transferring water from the first tank to the second tank including:

an outlet opening in the downstream side of the first tank; and a spillway extending from the first to the second tank to permit water to flow by gravity from the outlet opening into the second tank on the upstream side of the first wall of the second tank; and means for transferring water from the second tank including an outlet opening in the downstream side thereof, the lower edges of the outlet opening in each tank being intermediate the upper and lower edges of the first and second walls thereof so that water must pass beneath the lower edges of the first walls of each tank in order to induce flow along the bottom thereof, as it enters the tank, as well as beneath the lower edges of the second walls of each tank so as to deter fish from leaving the tank with the water; and means for injecting air into the water of each tank near the upstream side of the second wall thereof.

* * * * *